United States Patent [19]
Yoon

[11] Patent Number: 5,660,411
[45] Date of Patent: Aug. 26, 1997

[54] ACTIVE SUSPENSION SYSTEM FOR AN AUTOMOBILE

[75] Inventor: Young Whan Yoon, Kyungki-do, Rep. of Korea

[73] Assignee: Mando Machinery Corporation, Kyungki-do, Rep. of Korea

[21] Appl. No.: 580,198

[22] Filed: Dec. 28, 1995

[30] Foreign Application Priority Data

Dec. 28, 1994 [KR] Rep. of Korea ............... 1994-37828

[51] Int. Cl.$^6$ ............................................. B60G 11/26
[52] U.S. Cl. ...................................................... 280/714
[58] Field of Search ........................... 280/707, 714

[56] References Cited

U.S. PATENT DOCUMENTS 5,239,471  8/1993  Takahashi ................. 280/714

Primary Examiner—Kenneth R. Rice
Attorney, Agent, or Firm—Irving Keschner

[57] ABSTRACT

An automotive active suspension system according to this invention uses valves of a simplified structure so that the availability of installing space is improved and energy consumption is reduced by decreasing the quantity of the returned fluid.

This invention comprises a hydraulic pressure creating/supply apparatus; hydraulic actuators arranged between each wheel and body; wheel pressure control valves for proportionally controlling the pressure applied to each hydraulic actuator; main line pressure control valves arranged between said hydraulic pressure creating/supply apparatus and said wheel pressure control valves to control the main line pressure supplied through main lines; a predetermined pressure-maintaining valve which is located in a return line to said hydraulic pressure creating/supply apparatus from said wheel pressure control valves to receive a pilot pressure passing through said main line pressure control valves; and a relief valve which is located in a line connecting the upstream line of said main line pressure control valves and the downstream line of said predetermined pressure-maintaining valve in order that a bypass line of said main line pressure control valve is connected to the downstream line of said relief valve.

8 Claims, 3 Drawing Sheets

ACTIVE SUSPENSION SYSTEM FOR AN AUTOMOBILE

BACKGROUND OF THE INVENTION

This invention relates to an active suspension system for an automobile, and more particularly, to an active suspension system for an automobile which can maintain the vehicle-positioning control and controllability/stability at both the normal driving mode and abnormal trouble mode by continuously controlling fluid pressure of an hydraulic actuator utilizing a wheel pressure control valve and a predetermined pressure-maintaining valve.

An automotive active suspension system is a system which can actively control suspension itself, by leveling the vehicle or tuning the suspension according to the conditions of road surfaces or driving condition of an automobile utilizing a pressure source which provides force for eliminating the force of inertia applied to the vehicle body or external force being transmitted from the road surface. A typical example of such an automotive active suspension system is disclosed in U.S. Pat. No. 5,085,460, and its schematic hydraulic circuit is shown in FIG. 8.

The system has a hydraulic pump 1 as a pressure source, actuators 15 arranged at each wheel, control valve units 25 as means for controlling pressure of the actuators 15, and a pressure-maintaining unit 24 for controlling pressure.

Between a pressure accumulator 3 for absorbing pressure pulsations created by the hydraulic pump 1 which is a pressure source, and a relief valve 6 for setting the system pressure a filter 5 and a check valve 4 for preventing the filter 5 from being damaged are provided, and in the return line a hydraulic oil cooler 21 and a hydraulic oil tank 23 are provided.

The actuators 15, which are arranged corresponding with each wheel, include a sub-accumulator 13 and a damping orifice 14, and the control valve units 25 are divided into two for the front wheels and the rear wheels. There are two control valves 20 in the control valve unit 25 for the rear wheels, which control each actuator 15. There is a main pressure accumulator 11 in the supply line of the control valves 20, and there are a return pressure accumulator 16 and damping orifices 17,19 in the return line.

The pressure-maintaining unit 24 as a pressure control part includes an orifice 7 and integral flow control valve 8 for preventing the vehicular height level from suddenly being changed right after the engine starting, a safety valve 10 for preventing any sudden change of the vehicular height level and for maintaining a predetermined vehicular height level if trouble occurs in the electric circuit, and a pressure-maintaining check valve 18 and a relief valve 6. The pressure control valve 20, a proportional electronic type, which is arranged on a fluid line reaching the actuators 15, controls the posture of a vehicle by supplying or exhausting the hydraulic fluid to/from the actuators 15, for example, control outputs IF, IF from a control unit based on detecting output X of a positional acceleration sensor are transmitted to each proportional solenoid of the control valves 20, whereby the pressure control valve 20 controls the pressure of each actuator 15.

Such a hydraulic circuit as above operates as follows;

The relief valve 6,maintains the system pressure constant, and the flow control valve 8, including an ON/OFF solenoid 8S which is operated by the orifice 7 and control signal IFV, has the duty of preventing any sudden change of a vehicular height level right after the engine starting.

The pressure-maintaining check valve 18 is opened/closed to maintain a predetermined vehicular height level, by controlling pilot pressure of the fail safe valve 10 which is operated by the ON/OFF solenoid 10S which is operated by control signal IFS of the control unit 27 based on detecting signal Y of a fail detector 29.

The prevention of a sudden change of a vehicular height level, which is caused by variation of the return pressure according to the change of opening degree of the pressure-maintaining check valve 18 after the engine stops, is carried out by the damping orifice 17, the return pressure accumulator 16, and the main pressure accumulator 11. The main pressure accumulator 11 fills up the quantity of shortage of supply fluid from the hydraulic pump 1 in case that the actuators 15 urgently require much fluid, absorbs the variation of the supply pressure, and prevents the sudden change of a vehicular height level by smoothly reducing the return pressure according to leakage during constantly maintaining the return pressure by the operation of the check valve 18 after the engine stops. The return pressure accumulator 16 absorbs the pressure pulsations in the return line.

The sub-accumulator 15 and damping orifice 14 of each actuator 15, arranged to corresponding with each wheel, absorb the frequency vibrations.

However, in such a conventional hydraulic circuit, the flow control valve 8 having the ON/OFF solenoid 8S and the fail safe valve 10 having the ON/OFF solenoid 10S are very complex in their structure, and they consist of numerous parts, so that their requiring manufacturing is very difficult.

Further, because the above valves 8,10 are of a directly moving spool valve type, a big solenoid is used to directly control the spool. Accordingly, their dimensions become large. As a result, they require a large installation space.

On the other hand, the conventional system causes much energy loss because the return pressure is increased by the damping orifice 19 arranged on the return line 26R in the normal control mode.

SUMMARY OF THE INVENTION

It is an object of this invention to provide an automotive active suspension system which improves the availability of the installation space in a vehicle by using one control valve compared with a conventional controlling system which uses two valves.

It is another object of this invention to provide an automotive active suspension system which reduces energy consumption and noise by releasing the relief pressure at a low pressure instead of a high pressure.

In order to achieve the above purposes, an automotive active suspension system according to this invention includes:

a hydraulic pressure creating/supply apparatus;

hydraulic actuators arranged between each wheel and body;

wheel pressure control valves for proportionally controlling the pressure applied to each hydraulic actuator;

main line pressure control valves arranged between the hydraulic pressure creating/supply apparatus and the wheel pressure control valves to control the main line pressure supplied through the main lines;

a predetermined pressure-maintaining valve which is located in a return line to the hydraulic pressure creating/supply apparatus from the wheel pressure control valves to receive a pilot pressure passing through the main line pressure control valves; and a relief valve which is located in a line connecting the upstream line of the main line pressure control valves and the downstream line of the predetermined pressure-maintaining valve in order that a bypass line of the main line pressure control valve is connected to the downstream line of the relief valve.

In such an automotive active suspension system, the main line pressure control valves makes the system line, connected to the hydraulic pressure creating apparatus, communicate to the main line in the normal driving mode, and make it communicate to the bypass line in the trouble mode and the engine stop mode.

Further, in this system, the predetermined pressure-maintaining valve is opened in the normal driving mode, and it is closed in the trouble mode and the engine off mode.

DESCRIPTION OF THE PREFERRED EMBODIMENT

Figure 1A:
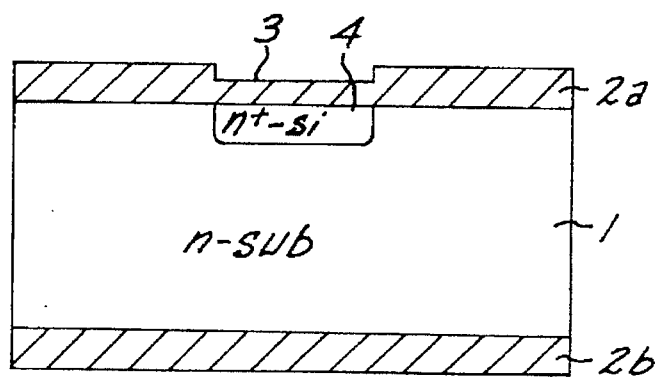
FIG. 1 is a hydraulic circuit diagram of an automotive active suspension system according to this invention.
Figure 1B:
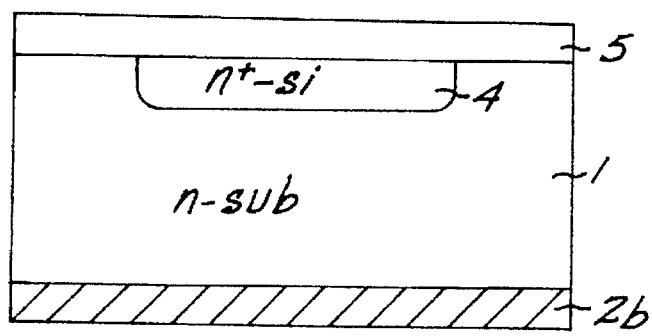
Figure 1C:
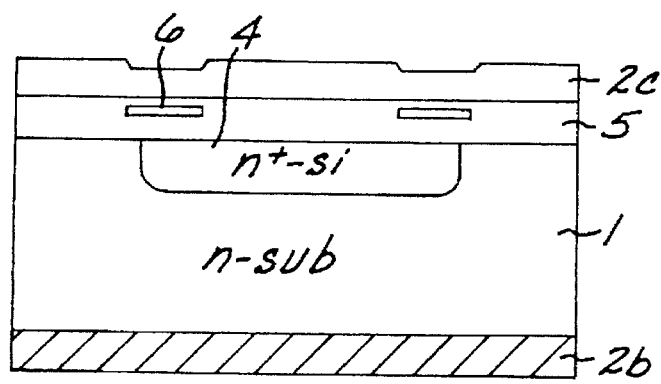
Figure 1D:
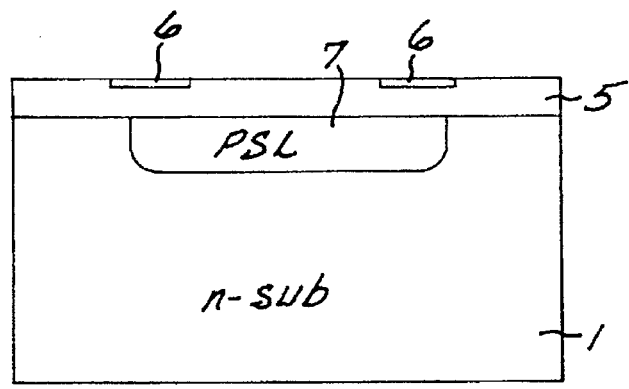
Figure 1E:
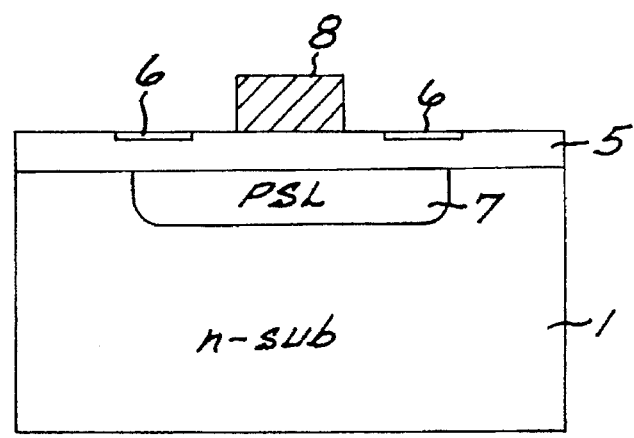
Figure 1F:
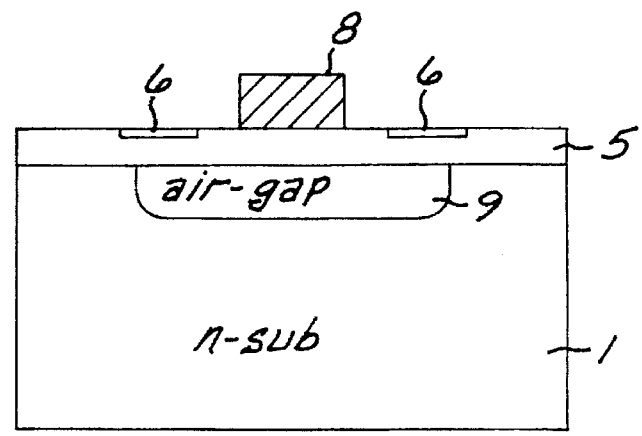
Figure 2A:
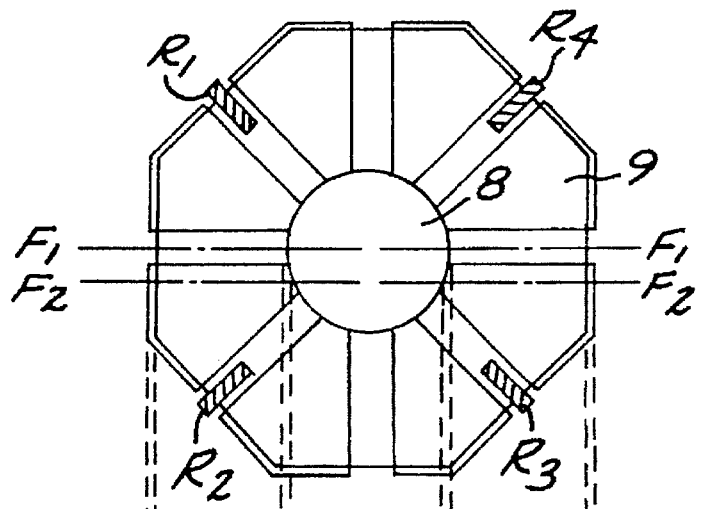
FIG. 2 is a cross-sectional view of a main line pressure control valve used in this invention.
Figure 2B:
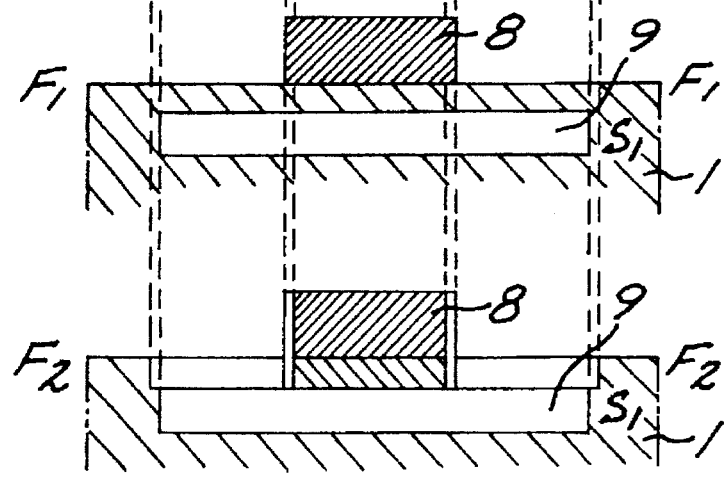
Figure 1:
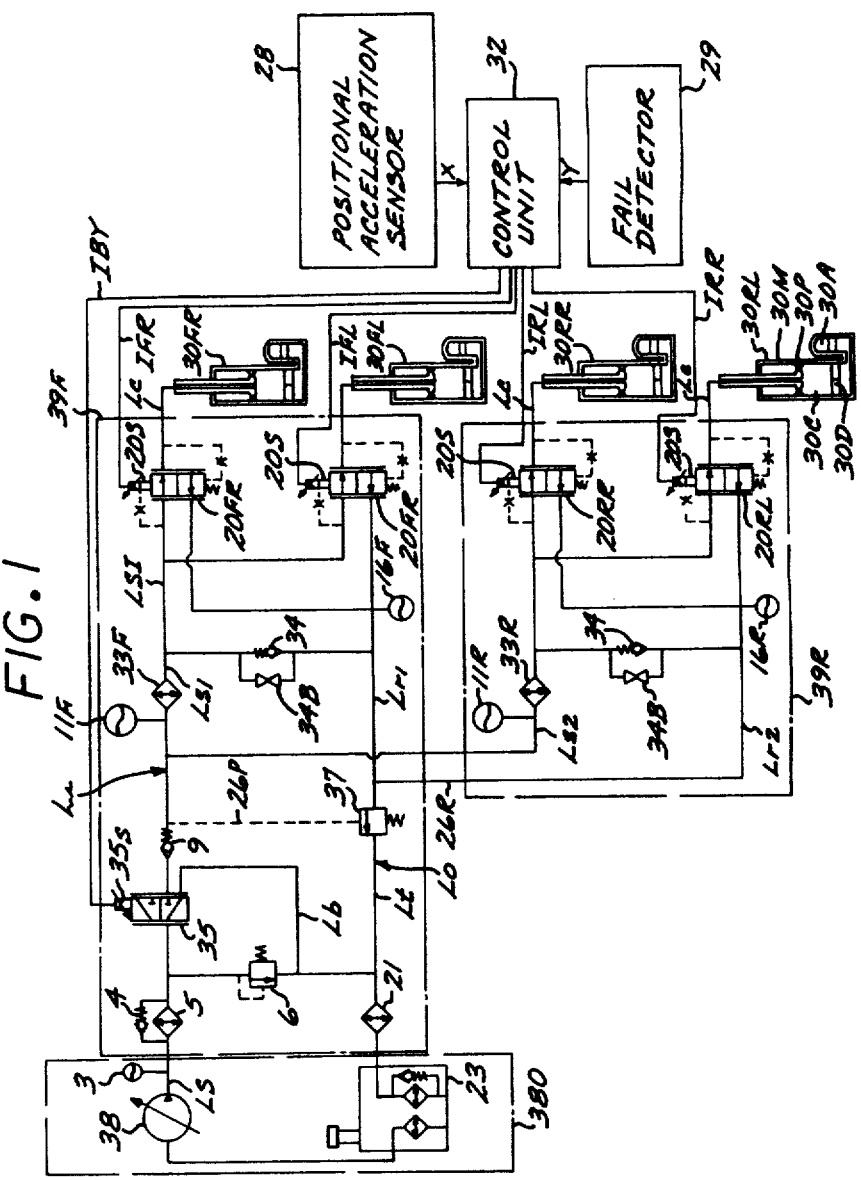

FIG. 1 is a hydraulic circuit diagram according to an embodiment of this invention.

This active suspension system comprises a hydraulic pressure creating/supply apparatus 380, hydraulic actuators 30FR, 30RR, 30RL 30RR and 30FL (hereinafter designated Numeral. 30) arranged between the vehicle body(not shown) and the respective wheels, a front wheel valve unit 39F and a rear wheel valve unit 39R which are arranged between the hydraulic pressure creating/supply apparatus 380 and each hydraulic actuator 30 to connect or disconnect the pressurized fluid from the hydraulic pressure creating/supply apparatus 380 to each hydraulic actuator 30, or from each hydraulic actuator 30 to the hydraulic pressure creating/supply apparatus 380.

The hydraulic pressure creating/supply apparatus 380 includes variable volume type hydraulic pump 38, a pressure accumulator 3 located at the output of the pump 38 to absorb the pumping pulsations, a hydraulic oil tank 23 having a filter and a check valve for preventing damage of the filter which is located at the inlet of the pump 38.

Hydraulic actuators 30 include a piston damping valve 30P, a body damping valve 34D 30D, a main pressure accumulator 30M having a cylinder pressure chamber 30C, and a sub-accumulator 30A communicating with the main pressure accumulator 30M.

The front wheel valve unit 39F includes a filter 5, a pressure control valve 35 for controlling the pressure in a supply line Li, and pressure control valves 20FR, 20FL of the front wheel side for controlling the fluid pressure being supplied to each hydraulic actuator 30, which are all located in the supply line Li.

A check valve 4 for preventing damage of the filter 5 is arranged in parallel, and a main check valve 9 is arranged downstream of the pressure control 35, and a filter 33F is arranged upstream of the pressure control valves 20FR, 20FL, and a pressure accumulator 33F, which is accumulating the pressure of the supply line Li, is arranged upstream of the filter 33F.

On the other hand, in the front wheel valve unit 39F, a valve 37 for maintaining a predetermined pressure for setting a vehicular height level is arranged on a return line Lo extending to the hydraulic oil tank 23 from each hydraulic control valve 20FR,20FL, and a hydraulic oil cooler 21 is arranged near the hydraulic oil tank 23. A return pressure accumulator 16F of the front wheel side is arranged between each hydraulic pressure control valve 20FR,20FL and the predetermined pressure-maintaining valve 37.

Further, a relief valve 6 for setting a pressure of a system line Ls between the pump 38 and the pressure control valve 35 in the supply line Li is arranged at the line connecting the upstream of the predetermined pressure-maintaining valve 37, and a check valve 34 for preventing the return pressure from being abnormal and an air vent 34B arranged in parallel with the valve 34 are provided at a line between the supply line Li and the return line Lo.

Hereinafter, for a clear explanation of the supply line Li, the line between the hydraulic pressure pump 38 and the pressure control valve 35 is named as a system line Ls, the line between the pressure control valve 35 and the pressure control valves 20FR,20FL of the front wheel side is named as a front wheel main line Ls1, the line between the pressure control valve 35 and the pressure control valves 20RR,20RL of the rear wheel side is named as a rear wheel main line Ls2, and the line between each wheel pressure control valve 20FR,20FL,20RR,20RL and each hydraulic actuator 30 is named as a control line Lc.

Also, on the return line Lo, the line between the pressure control valves 20FR,20FL of the front wheel side and the predetermined pressure-maintaining valve 37 is named as a front wheel return line Lr1, the line between the pressure control valves 20RR,20RL of the rear wheel side and the predetermined pressure-maintaining valve 37 is named as a rear wheel return line Lr2, the line between the predetermined pressure-maintaining valve 37 and the hydraulic oil tank 23 is named as a tank line Lt, the line which is directly connected to the tank line Lt from the pressure control valve 35 is named as a bypass line Lb, and the line which is connected to the predetermined pressure-maintaining valve 37 after being branched from the downstream line of the pressure control valve 35 is named as a pilot line 26P.

The rear wheel valve unit 39K consists of the rear wheel side pressure control valves 20RR,20RL which control the fluid pressure transmitted to each actuator 30, and a filter 33R is provided at the upstream side of the pressure control valves 20RR,20RL, and at the upstream side of the filter 33R a pressure accumulator 33R is installed which accumulates the fluid pressure of the supply line Li.

Further, a check valve 34 for preventing the return pressure from being abnormal and an air vent 34B arranged in parallel to the valve 34 are provided at the line connecting the rear wheel main line Ls2 to the rear wheel return line Lr2.

A rear wheel side return pressure accumulator 16R is also installed between each, pressure control valve 20RR,20RL and the predetermined pressure-maintaining valve 37.

In such a hydraulic circuit according to this invention, by means of a creating signal X from a positional acceleration sensor 28 and a creating signal Y from a fail detector 29 in order to control the pressure of the hydraulic pump 38 and the pressure of each hydraulic actuator 30, a control unit 32 sends a control signal IBY to the proportional solenoid 35S of the main line pressure control valve 35, and sends control signals IFL, IFR, IRR, IRL (hereinafter named as Ic) to the proportional solenoids 20S of each wheel pressure control valve 20FR,20FL,20RR,20RL, thereby maintaining an optimum posture of a vehicle.

Figure 2:
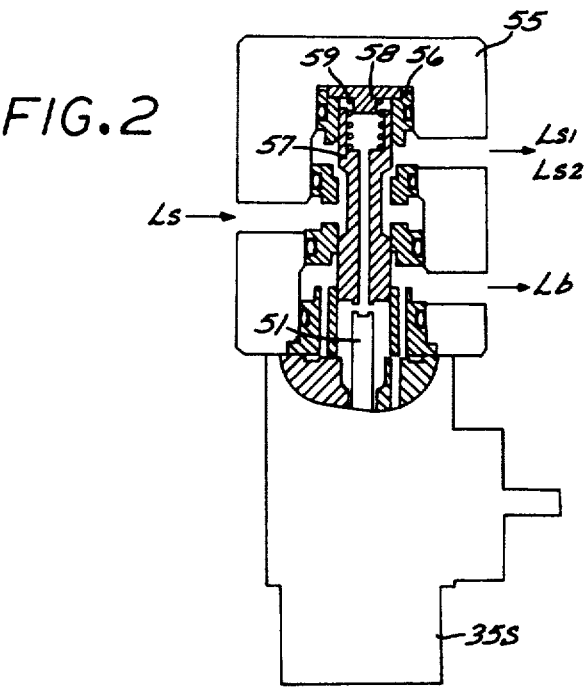

As shown in FIG. 2, the main line pressure control valve 35 comprises a body 55, a spool 57 capable of sliding in the body 55, and a spool sleeve 56 arranged at the outside of the spool 57. On one end of the spool 57 a spring 59 is mounted which applies a constant elastic force set by the regulation of a spring jig 58, to the spool 57, and a plunger 51 in the proportional solenoid 35S which is operated by the control signal IBY extends towards the other end of the spool 57.

FIG. 2 shows the ON position of the proportional solenoid 35S(namely, the normal condition during the engine driving), in which the plunger 51 pushes the spool 57 to the upside so that the system line L and the front/rear main lines Lr1,Ls2 communicate with each other. On the other hand, in the OFF position of the proportional solenoid 35S(namely, the engine stopped, or abnormal condition during the engine driving) the plunger 51 moves downward, and at the same time the spool 57 is moved downward by the spring 59, so that the system line Ls communicates with the bypass line Lb.

Figure 3:
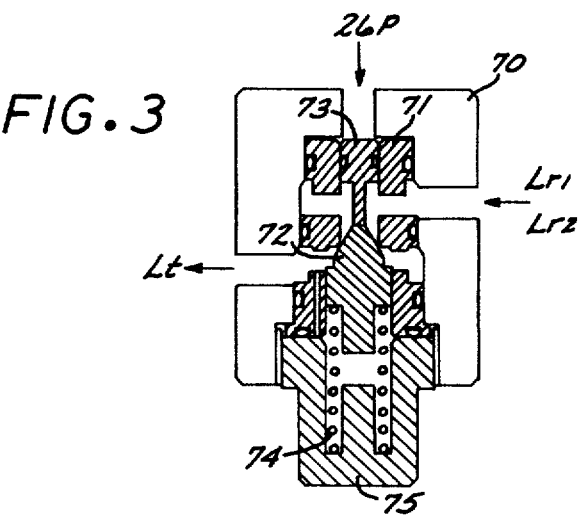
FIG. 3 is a cross-sectional view of a predetermined pressure-maintaining valve used in this invention.

As shown in FIG. 3, the predetermined pressure-maintaining valve 37 comprises a body 70, a sleeve 71 arranged in the interior of the body 70, a pilot spool 73 so as to be capable of sliding in the sleeve 71, and a pilot poppet 72 which is arranged in contacting position with one end of the pilot spool 73 so that the front/rear wheel return lines Lr1,Lr2 can communicate with the tank line Lt.

The predetermined pressure-maintaining valve 37 further includes a spring 74 for elastically supporting the other end of the pilot poppet 72 and a regulating jig 75 which can regulate the elastic force of the spring 74 in order to apply a predetermined cracking force to the pilot poppet 72.

The predetermined pressure-maintaining valve forms such a structure that the pilot poppet 72 moves downward so that the front/rear wheel return lines Lr1,Lr2 communicate with tank line Lt, in the case that resultant forces of the fluid pressure in the pilot line 26P plus the pressure in the front/rear wheel return lines Lr1,Lr2 exceed the cracking force as a predetermined force of the spring 74.

Figure 4:
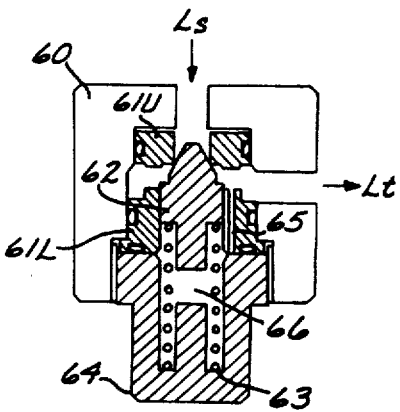
FIG. 4 is a cross-sectional view of a relief valve used in this invention.

As shown in FIG. 4 illustrating the relief valve 6, the relief valve 6 comprises a body 60, upper/lower sleeves 61U,61L, and a poppet 62 arranged so as to be capable of sliding in the lower sleeve 61L. The relief valve 6 further includes a spring 63, which is arranged at the lower side of the poppet 62 to apply the elastic force to the poppet 62 so as for the poppet 62 to contact the upper sleeve 61U, and a regulating jig 64 for regulating the elastic force of the spring 63 so as to apply a predetermined cracking force to the poppet 62.

In the lower sleeve 61L an orifice 65 is provided to send fluid into the chamber 66 to the tank line Lt. The relief valve 6 has such a structure that the poppet 62 moves downward so as for the system line Ls to communicate with the tank line Lt in the case that the fluid pressure from the system line Ls exceeds a predetermined pressure of the spring 63. If the poppet 62 moves downward, the pressurized fluid in the chamber 66 is discharged to the tank line Lt through the orifice 65 for inducing resistance of the fluid, whereby the chattering phenomena by a sudden change of the pressure in the chamber 66 is prevented.

Figure 5:
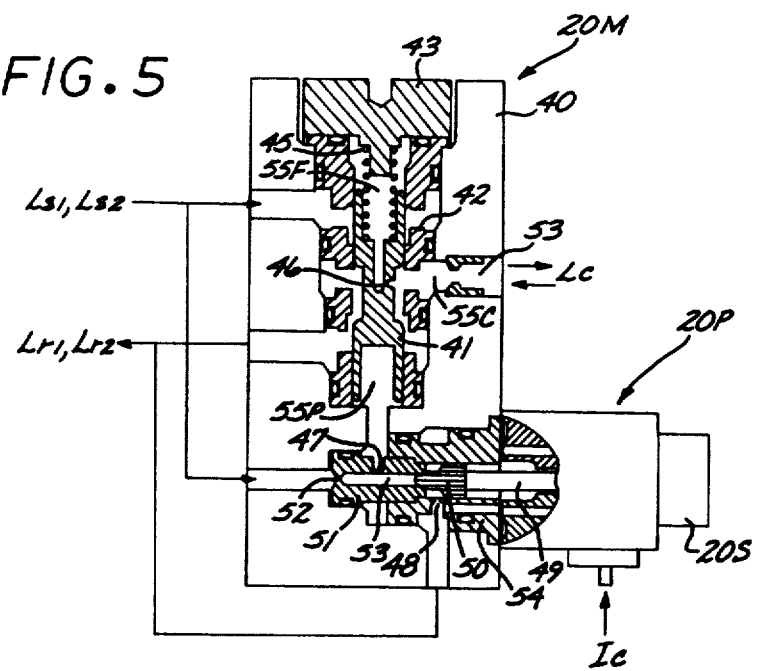
FIG. 5 is a cross-sectional view of a wheel proportional pressure control valve used in this invention.

As shown in FIG. 5, the wheel pressure control valve 20 includes a pilot valve 20P which is operated by control signal Ic sent from the control unit 32 in order that body vibrations according to the condition of road surfaces reacts in the range of low frequency, and a main valve 20M which mechanically operates in order that the above vibrations react in the range of medium frequency.

The pilot valve 20P comprises a body 40, an outer sleeve 54 having a return orifice 48 which communicates with the return lines Lr1,Lr2, and an inner sleeve 51 having both a supply orifice 52 communicating with the main lines Ls,Ls2 and a pilot orifice 47 to send fluid to the main valve 20M. The pilot valve also includes a poppet 50 which is arranged in the condition of being able to slide in the outer sleeve 54 and the head portion of which can block one end of a poppet passage 53. Further, the pilot valve 20P includes a plunger 49 in the proportional solenoid 20S which is operated by the control signal Ic, to push the rear portion of the poppet 50.

The main valve 20M comprises the common body 40 with the pilot valve 20P, a spool sleeve 42 mounted in the body 40, and a spool 41 arranged so as to be able to slide in the spool sleeve 42. The spool sleeve 42 includes a port communicating with the main lines Lr1,Ls2, a port communicating with the control line Lc, and a port communicating with the return lines Lr1,Lr2.

The spool 41 has a pilot chamber 55P in its lower portion, which communicates with the pilot orifice 47, a return chamber 55F in its upper portion, which contains a spring 45 compressed by a jig 43, and a return orifice 46 which connects the return chamber 55F to the outside of the spool 41.

In such a wheel pressure control valve 20, in case that the body vibrations are in the range of low frequency, the force of the proportional solenoid 20S increasing linearly, the plunger 49 gradually moves left, and then the poppet 50 gradually closes the poppet passage 53. With increasing the pressurized fluid in the passage 53, the pressure in the pilot orifice 47 increases gradually to raise the spool 41 little by little. This causes that the opening degree of the ports communicating the main lines Lr1,Ls2 with the control line Lc to become gradually larger. Consequently, the quantity of the fluid flowing to the control line Lc increases.

On the other hand, in the case that the wheels encounter a projected part on the road's surface, namely the wheels bound and the pressure of the compression chamber 30C in the hydraulic actuator 30 increases. At this time, with an increase of the fluid pressure in the control line Lc, the fluid flows to the return chamber 55F through the return orifice 46, so that the spool 41 is moved downward by the increased pressure, whereby the control line Lc communicates with the return lines Lr1,Lr2. Consequently, the fluid in the control line Lc flows to the return lines Lr1,Lr2, so that the pressure of the compression chamber 30C in the hydraulic actuator 30 decreases, thereby maintaining a predetermined vehicular height level.

On the contrary, in the case that the wheels pass an indented part in the road, namely the wheels rebound and the pressure of the compression chamber 30C in the hydraulic actuator 30 decreases. At this time, with a decrease of the fluid pressure in the control line Lc, the fluid in the return chamber 55F flows to the control line Lc through the return orifice 46, so that the spool 41 is moved upward, whereby the control line Lc communicates with the main lines Lr1,Ls2. Consequently, the fluid in the main lines Lr1,Ls2 flows to the control line Lc, so that the pressure of the compression chamber 30C in the hydraulic actuator 30 increases, thereby maintaining a predetermined vehicular height level.

Figure 6:
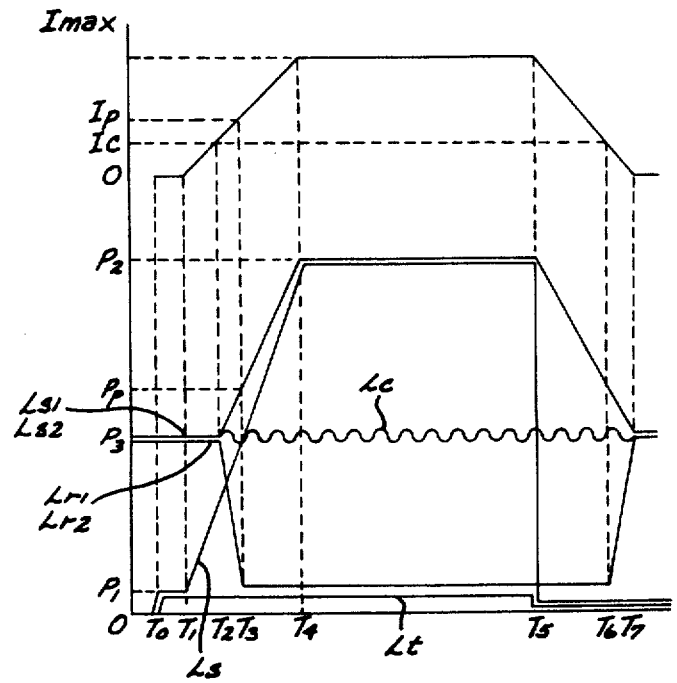
FIG. 6 is a graph showing pressure variation in the hydraulic circuit in the normal driving mode.

The hydraulic circuit of this invention constructed as above operates as follows:

FIG. 6 is a chart illustrating the variation of the fluid pressure in each hydraulic line in the condition of the engine stopped, right after the engine starting, and in various modes during normal driving. While the engine is stopped (0-T0), with the neutral position of the spool 41 in the wheel pressure control valve 20, the main lines Lr1,Ls2 and the return lines Lr1,Lr2 communicate with the control line Lc connecting to the hydraulic actuator 30. The front/rear wheel main lines Lr1,Ls2 are blocked from the system line Ls by the spool 57 in the main line pressure control valve 35. Also, the predetermined pressure-maintaining valve 37 closes. Therefore, the fluid pressure in both the main lines Lr1,Ls2 and the return lines Lr1,Lr2 becomes the same pressure as a pressure P3 for maintaining a predetermined vehicular height level in the control line Lc. In this condition, the fluid pressure in both the system line Ls and the tank line Lt is zero.

Right after the engine starting(T0), with gradual pumping of the hydraulic pump 38, the fluid pressure in the system line Ls becomes P1, and the fluid flows to the bypass line Lb through the main line pressure control valve 35, whereby the pressure of the bypass line Lb also becomes P1.

The fluid pressure in the system line Ls keeps P1 for the time T1. Even at this time, the fluid pressure in the main lines Lr1,Ls2 and the return lines Lr1,Lr2 continuously maintains the pressure P3 for maintaining the vehicular height level because not only the system line Lb in the main line pressure control valve 35 is blocked from the front/rear wheel main lines Lr1,Ls2, but also the predetermined pressure-maintaining valve 37 continues to remain closed.

For the time T2, the fluid pressure in the system line Ls gradually rises to the pressure P3 for maintaining the vehicular height level. From the time T1, with the control signals IBY which are sent to the proportional solenoid 35S in the main line pressure control valve 35, increasing linearly, the system line Ls starts to communicate with the front/rear wheel main lines Lr1,Ls2, so that the fluid pressure in the system line Ls increases with the fluid pressure in the front/rear wheel main lines Lr1,Ls2 which was maintaining the pressure P3 for maintaining the vehicular height level. At the same time, the predetermined pressure-maintaining valve 37 starts to be opened gradually by the pressure of the fluid passing through the pilot line 26P. Consequently, the fluid pressure in the return lines Lr1,Lr2 decreases gradually.

For the time T3, the fluid pressure in the main lines Lr1,Ls2 increases gradually to reach the pilot pressure Pp where the predetermined pressure-maintaining valve 37 is opened completely. Accordingly, the fluid pressure in the return lines Lr1,Lr2 decreases to low pressure P1.

For the time T4, by the operation of the hydraulic pump 38, the fluid pressure in the system line Ls increases to the system pressure P2, and the main lines Lr1,Ls2 in the main line pressure control valve 35 communicate with the system line Ls completely, whereby the fluid pressure in the main lines Lr1,Ls2 also maintains at P2.

While the normal driving from T4 to T5, the fluid pressure in the system line Ls and the main lines Lr1,Ls2 maintains P2, while the fluid pressure in the return lines Lr1,Lr2 and the tank line Lt maintains P1. In this condition, the fluid pressure in the control line Lc keeps the pressure P3 for maintaining the vehicular height level.

Under the condition that each line keeps the respective pressures as above, by the control signal Ic created by the control unit 32 when the vehicular posture changes, the wheel pressure control valve 20 is operated, whereby the vehicle can be driving in the condition of maintaining the vehicular height level.

The operation of the wheel pressure control valve 20 will not be described because it has been described already.

At the time T5 when the hydraulic pump 38 stops, the fluid pressure in the system line Ls and the tank line Lt become zero. At the same time, the fluid pressure in the main lines Lr1,Ls2 starts to decrease gradually.

At the time T6, the main lines Lr1,Ls2 which have been communicating with the system line Ls in the main line pressure control valve 35, start to block each other. At the same time, with the fluid pressure in the main lines Lr1,Ls2 becoming the pilot pressure Pp, the predetermined pressure-maintaining valve 37, which has been communicating with the pilot line 26P, starts to close gradually.

At the time T7, the main lines Lr1,Ls2, which have been communicating with the system line Ls in the main line pressure control valve 35, are blocked completely. The return lines Lr1,Lr2, and the tank line Lt, which has been communicating with each other by the predetermined pressure-maintaining valve 37, are also blocked completely. As a result, both the pressure of the main lines Lr1,Ls2 and the pressure of the return lines Lr1,Lr2 keep the pressure of the control line Lc and the pressure P3 for maintaining the vehicular height level.

Figure 7:
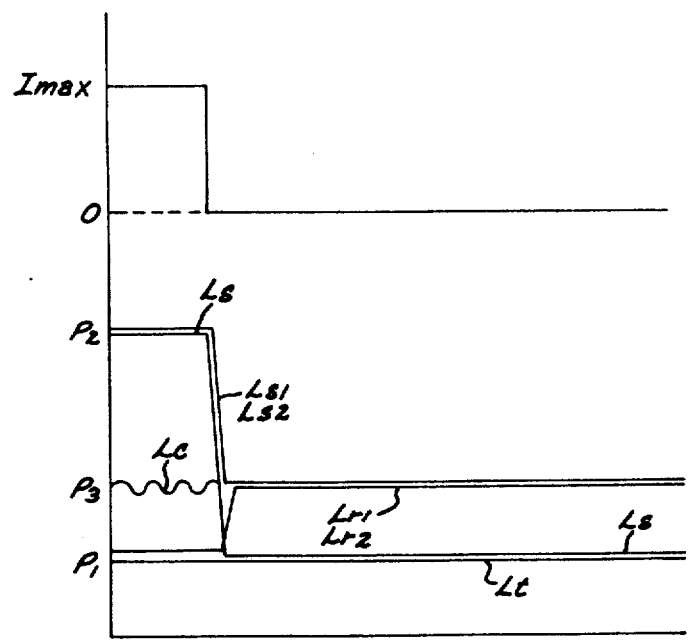
FIG. 7 is a graph showing pressure variation in the hydraulic circuit in the trouble mode.
Figure 8:
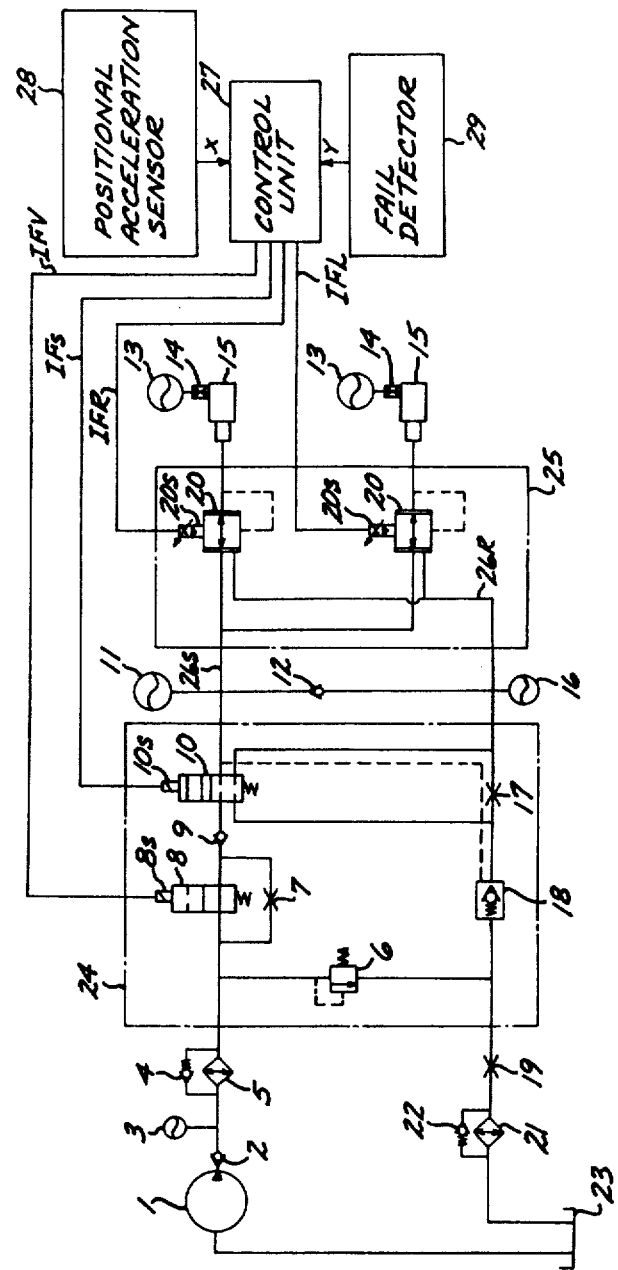
FIG. 8 is a hydraulic circuit diagram of an conventional automotive active suspension system.

FIG. 7 is a chart illustrating variation of the fluid pressure in each hydraulic line when any trouble happens during normal driving. If any system trouble occurs at the time T5, namely during normal driving, the control signal IBY from the control unit 32, which is sent to the proportional solenoid 35S of the main line pressure control valve 35, is broken. At this time, the system line Ls, which communicates with the main lines Lr1,Ls2 in the main line pressure control valve 35, communicate with the bypass line Lb. Accordingly, the fluid pressure in the main lines Lr1,Ls2 decreases to keep the pressure P3 for maintaining the vehicular height level. At the same time, the pressure of the fluid, flowing to the predetermined pressure-maintaining valve 37 through the pilot line 26P, decreases, and therefore the return lines Lr1,Lr2 and the tank line Lt in the predetermined pressure-maintaining valve 37, are disconnected completely from each other. At this time, the pressure of the return lines Lr1,Lr2, which has been maintained as P1, rises to P3 by the pressure of the main lines Lr1,Ls2. Consequently, the pressure of the main lines Lr1,Ls2 and the return lines Lr1,Lr2 remains at P3 for maintaining the vehicular height level equal to the pressure of the control line Lc.

Even in this condition, the hydraulic pump 38 continues to operate in order to move the vehicle. But, the pressurized fluid is relieved to the low pressure P1 and then returned to the hydraulic oil tank 23 through the tank line Lt because the system line Ls of the main line pressure control valve 35 is connected to the bypass line Lb.

As explained above in detail, this invention has a duty of a predetermined vehicular height level in the system trouble mode and parking mode and for preventing any sudden change of the vehicular height level right after the engine starting/stopping, by the combination of both the predetermined pressure-maintaining valve and the main line pressure-maintaining valve which all have a simple structure.

Further, because the main line pressure control valve, the proportional pressure control valve, the relief valve, and the predetermined pressure-maintaining valve hold some parts in common and their structure is similar, worn parts in the working process decrease, their assembly is easier, and the manufacturing cost is reduced.

Further, by adapting the method of completely shutting off the main line pressure control valve in the normal control mode, the returned fluid, that is, the consumed fluid is reduced, and the pressure in the return line becomes nearly zero pressure, thereby minimizing energy consumption.

Further, during normal driving, the predetermined pressure-maintaining valve is completely opened so that the fluid is easily returned to the hydraulic oil tank, and if trouble in the system arises causing the engine to stop, the system renders the hydraulic lines the pressure for maintaining the vehicular height level smoothly, and especially even if trouble occurs in the system during the driving mode, the pressurized fluid from the pump is relieved at a lower pressure because the main line pressure control valve is completely opened, thereby reducing energy consumption and noise.

Further, the noise and vibrations, which bring about severe damage to the performance of the relief valve and the entire hydraulic circuit system, is eliminated because the chattering phenomenon is prevented by installing a damping orifice in the relief valve by using a direct moving type with a simplified structure.

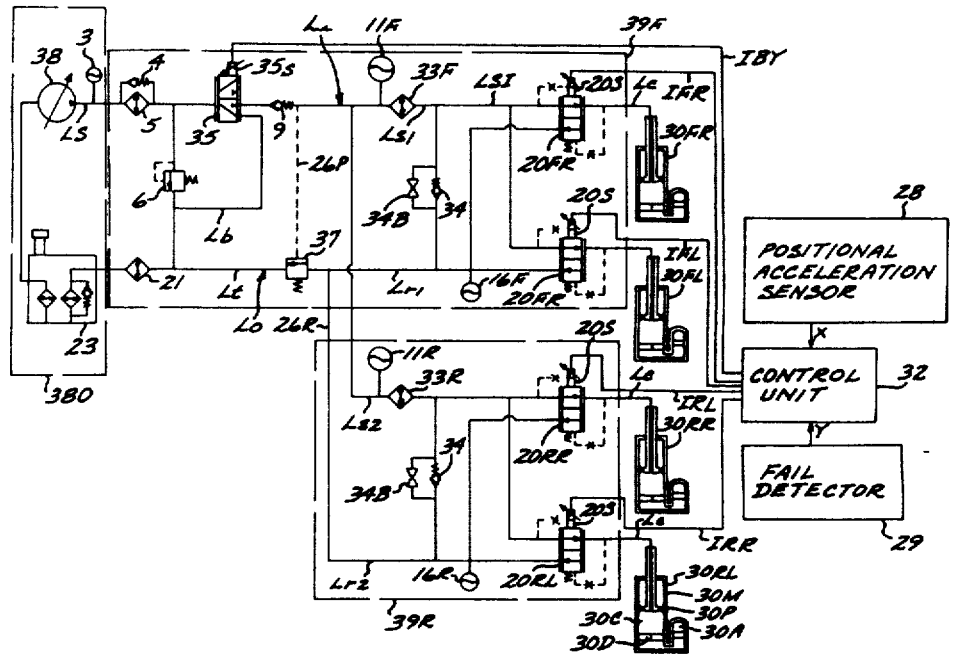

What is claimed is:

1. An automotive active suspension system having a body and a plurality of wheels comprising:

a hydraulic pressure creating/supply apparatus;

hydraulic actuators arranged between each wheel and body;

wheel pressure control valves for proportionally controlling the pressure applied to each hydraulic actuator;

a main line pressure control valve arranged between said hydraulic pressure creating/supply apparatus and said wheel pressure control valves to control the main line pressure supplied through the main lines;

a predetermined pressure-maintaining valve located in a return line to said hydraulic pressure creating/supply apparatus from said wheel pressure control valves to receive a pilot pressure passing through said main line pressure control valve;

a relief valve located in a line connecting the upstream line of said main line pressure control valve and the downstream line of said predetermined pressure-maintaining valve;

a bypass line for connecting said main line pressure control valve to the downstream line of said relief valve; and means for controlling said main line pressure control valve wherein said hydraulic pressure creating/supply apparatus communicates with the main line in the normal driving mode and communicates with said bypass line in the trouble and engine stop modes.

2. An automotive active suspension system according to claim 1 wherein said predetermined pressure-maintaining valve comprises a body, a sleeve arranged in the interior of said body, a member for sliding within said sleeve member and a poppet member arranged in contacting position with one end of said sliding member so that the front/rear wheel return lines communicate with the return line, a spring for elastically supporting the other end of said sliding member and a member for regulating the elastic force of the spring in order to apply a predetermined force to said poppet.

3. The automotive active suspension system according to claim 2 where said popper member moves downward so that the front/rear wheel return lines communicate with the return line when the total forces of the fluid pressure in the pilot line and the pressure in the front/rear wheel return lines exceed said spring predetermined force.

4. An automotive active suspension system according to claim 1, wherein said predetermined pressure-maintaining valve is opened in the normal driving mode, and is closed during the trouble mode and the engine stop mode.

5. An automotive active suspension system according to claim 4, wherein said predetermined pressure-maintaining valve starts to be open when the pressure of said main line becomes the pilot pressure.

6. An automotive active suspension system according to claim 1 wherein said main line pressure control valve comprises a body, a member capable of sliding in said body, a sleeve arranged at the outside of said sliding member, a spring mounted on one end of the sliding member, the spring applying a substantially constant force to said sliding member, and a plunger member positioned at the opposite end of said sliding member, said plunger member being controlled by said controlling means.

7. An automotive active suspension system according to claim 6 wherein said plunger forces said sliding member to a position whereby the main system line communicates with the front/rear main lines during the normal driving mode and wherein the plunger moves in the opposite direction causing said spring member to move said sliding member in the opposite direction whereby the main line communicates with said bypass line in the engine stopped and trouble modes.

8. The automotive active suspension system according to claim 1 wherein each of said wheel pressure control valves comprise a pilot valve operated by said controlling means and a main valve, the pilot valve comprising a body, an outer sleeve having a return orifice communicating with first and second return lines, an inner sleeve having a supply orifice communicating with first and second main lines, a pilot orifice for sending fluid to said main valve, a poppet adjusted to slide within said outer sleeve and a plunger operated by said controlling means to push the rear portion of said popper, said main valve comprising a body, positioned adjacent to said pilot valve, a sleeve member mounted in said body and a spool member arranged to slide in said sleeve member, said sleeve member having a port which communicates with first and second main lines, a port communicating with a control line and a port communicating with said first and second return lines, said spool member having a pilot chamber communicating with said pilot orifice in a first position, and with a return chamber in a second position, said return chamber containing a spring member and a return orifice for connecting said return chamber to the exterior of said spool member.

\* \* \* \* \*

UNITED STATES PATENT AND TRADEMARK OFFICE
CERTIFICATE OF CORRECTION

PATENT NO. : 5,660,411
DATED : August 26, 1997
INVENTOR(S) : Young Whan Yoon

It is certified that error appears in the above-identified patent and that said Letters Patent is hereby corrected as shown below:

The title page should be deleted and substitute therefor the attached title page.

Drawings:
Delete Drawing Sheets 1-8, and substitute therefor the Drawing Sheets, consisting of Figs. 1-8, as shown on the attached pages.

Signed and Sealed this

Third Day of February, 1998

Attest:

BRUCE LEHMAN

*Attesting Officer*  *Commissioner of Patents and Trademarks*

United States Patent [19]
Yoon

[11] Patent Number: 5,660,411
[45] Date of Patent: Aug. 26, 1997

[54] ACTIVE SUSPENSION SYSTEM FOR AN AUTOMOBILE

[75] Inventor: Young Whan Yoon, Kyungki-do Rep of Korea

[73] Assignee: Mando Machinery Corporation, Kyungki-do Rep of Korea

[21] Appl No: 580,198

[22] Filed: Dec. 28, 1995

[30] Foreign Application Priority Data

Dec 28 1994 [KR] Rep of Korea .. .... 1994-37828

[51] Int. Cl.⁶ ............................................. B60G 11/26
[52] U S Cl ................................................... 280/714
[58] Field of Search ............................. 280/707, 714

[56] References Cited

U S PATENT DOCUMENTS 5,239,471 8/1993 Takahashi .......................... 280/714

Primary Examiner—Kenneth R. Rice
Attorney, Agent or Firm—Irving Keschner

[57] ABSTRACT

An automotive active suspension system according to this invention uses valves of a simplified structure so that the availability of installing space is improved and energy consumption is reduced by decreasing the quantity of the returned fluid.

This invention comprises a hydraulic pressure creating/supply apparatus, hydraulic actuators arranged between each wheel and body, wheel pressure control valves for proportionally controlling the pressure applied to each hydraulic actuator; main line pressure control valves arranged between said hydraulic pressure creating/supply apparatus and said wheel pressure control valves to control the main line pressure supplied through main lines, a predetermined pressure-maintaining valve which is located in a return line to said hydraulic pressure creating/supply apparatus from said wheel pressure control valves to receive a pilot pressure passing through said main line pressure control valves, and a relief valve which is located in a line connecting the upstream line of said main line pressure control valves and the downstream line of said predetermined pressure-maintaining valve in order that a bypass line of said main line pressure control valve is connected to the downstream line of said relief valve

8 Claims, 3 Drawing Sheets